(12) United States Patent
Covell et al.

(10) Patent No.: US 11,477,229 B2
(45) Date of Patent: Oct. 18, 2022

(54) PERSONALIZED SECURITY TESTING COMMUNICATION SIMULATIONS

(71) Applicant: International Business Machines Corporation, Armonk, NY (US)

(72) Inventors: Jacob Thomas Covell, New York, NY (US); Robert Huntington Grant, Marietta, GA (US); Clarissa Ho, New York, NY (US); Nicholas Bokun, Stratford, NJ (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 16/808,620

(22) Filed: Mar. 4, 2020

(65) Prior Publication Data
US 2021/0281596 A1   Sep. 9, 2021

(51) Int. Cl.
*H04L 9/40* (2022.01)

(52) U.S. Cl.
CPC ...... *H04L 63/1433* (2013.01); *H04L 63/1483* (2013.01)

(58) Field of Classification Search
CPC ............. H04L 63/1433; H04L 63/1483; H04L 63/102
See application file for complete search history.

(56) References Cited

U.S. PATENT DOCUMENTS

| | | | |
|---|---|---|---|
| 8,484,741 B1 | 7/2013 | Chapman | |
| 8,615,807 B1 | 12/2013 | Higbee et al. | |
| 9,635,052 B2 | 4/2017 | Hadnagy | |
| 9,729,573 B2 | 8/2017 | Gatti | |
| 9,749,360 B1 | 8/2017 | Irimie et al. | |
| 9,882,932 B2 | 1/2018 | Bringsjord et al. | |
| 9,942,249 B2 | 4/2018 | Gatti | |
| 10,021,126 B2* | 7/2018 | Irimie | .............. H04L 63/1433 |
| 10,599,725 B2* | 3/2020 | Ward | .................. G06F 16/951 |
| 2003/0009696 A1* | 1/2003 | Bunker V. | .......... H04L 63/1433 726/26 |
| 2010/0031093 A1* | 2/2010 | Sun | ...................... H04L 63/102 714/45 |
| 2013/0343181 A1* | 12/2013 | Stroud | .................. H04L 69/22 370/392 |
| 2015/0288717 A1 | 10/2015 | Bringsjord | |
| 2016/0234245 A1 | 8/2016 | Chapman | |
| 2016/0330238 A1 | 11/2016 | Hadnagy | |
| 2017/0006055 A1* | 1/2017 | Strom | ................... G06F 30/20 |

(Continued)

FOREIGN PATENT DOCUMENTS

| | | | | |
|---|---|---|---|---|
| EP | 3930286 A1 | * 12/2021 | ....... | G06Q 10/06393 |
| WO | WO-2019227076 A1 | * 11/2019 | ....... | H04L 12/40013 |
| WO | WO-2021171090 A1 | * 9/2021 | ............. | G06N 20/00 |

*Primary Examiner* — Sarah Su
(74) *Attorney, Agent, or Firm* — Timothy J. Singleton (57) ABSTRACT

A method, system, and computer program product for generating personalized security testing simulations is provided. The method identifies a user of a communications system. The user is associated with a user profile. The method generates a simulated attack communication based on the user, the user profile, and an attack personalization model. The simulated attack communication is transmitted to the user via the communications system. The method identifies a user response to the simulated attack communication and modifies the attack personalization model based on the user response.

20 Claims, 6 Drawing Sheets

(56) References Cited

U.S. PATENT DOCUMENTS

| | | | |
|---|---|---|---|
| 2017/0318046 A1* | 11/2017 | Weidman | H04L 63/1433 |
| 2018/0212980 A1* | 7/2018 | Oyamada | H04L 63/1425 |
| 2021/0160282 A1* | 5/2021 | Irimie | G06N 3/082 |
| 2021/0367970 A1* | 11/2021 | Carpenter | G06F 9/453 |
| 2021/0390181 A1* | 12/2021 | McClay | G06F 21/56 |

* cited by examiner

PERSONALIZED SECURITY TESTING COMMUNICATION SIMULATIONS

BACKGROUND

Technological vulnerabilities have been exploited by technological and social means. Social engineering, social media attacks, phishing, and other similar attacks have been used to breach or work around security measures in technological systems. In phishing attacks, malicious entities send communications, impersonating reputable entities, to prompt individuals and companies to reveal sensitive information or provide attack vectors through compromised media attachments. Such attacks present a pervasive problem in a modern and technology-dependent society, especially as more and more businesses shift confidential and sensitive information online. Such data migrations allow for a larger pool to target for phishers and hackers. The spear-phishing is tailored version of traditional phishing attacks. Spear-phishing uses personalized information to target a specific victim. While phishing may use a broad approach to generally target many victims, spear-phishing narrows the approach in an attempt to increase the effectiveness of the attack and reduce risks of detection prior to success. Thus, spear-phishing has grown as a response to the wide scale phishing detection systems implemented at many firms.

The increased use of spear-phishing in recent years signifies a shift from simplified phishing attacks to highly specialized spear-phishing attacks as hackers re-focus their efforts to make more personalized and effective attempts to obtain sensitive information. Current social trends create a favorable environment for the spear-phishing phenomenon due to the plethora of accessible online data via social media accounts, professional networks, company profiles, and other public facing or publicly available information. Such trends along with the mass migration of data from offline to online increases the susceptibility of users and companies to spear-phishing attempts.

SUMMARY

According to an embodiment described herein, a computer-implemented method for generating personalized security testing simulations is provided. The method identifies a user of a communications system. The user may be associated with a user profile. The method generates a simulated attack communication based on the user, the user profile, and an attack personalization model. The simulated attack communication is transmitted to the user via the communications system. The method identifies a user response to the simulated attack communication and modifies the attack personalization model based on the user response.

According to an embodiment described herein, a system for generating personalized security testing simulations is provided. The system includes one or more processors and a computer-readable storage medium, coupled to the one or more processors, storing program instructions that, when executed by the one or more processors, cause the one or more processors to perform operations. The operations identify a user of a communications system. The user may be associated with a user profile. The operations generate a simulated attack communication based on the user, the user profile, and an attack personalization model. The simulated attack communication is transmitted to the user via the communications system. The operations identify a user response to the simulated attack communication and modify the attack personalization model based on the user response.

According to an embodiment described herein a computer program product for generating personalized security testing simulations is provided. The computer program product includes a computer readable storage medium having program instructions embodied therewith, the program instructions being executable by one or more processors to cause the one or more processors to identify a user of a communications system. The user may be associated with a user profile. The computer program product generates a simulated attack communication based on the user, the user profile, and an attack personalization model. The simulated attack communication is transmitted to the user via the communications system. The computer program product identifies a user response to the simulated attack communication and modifies the attack personalization model based on the user response.

DETAILED DESCRIPTION

The present disclosure relates generally to methods for vulnerability testing. More particularly, but not exclusively, embodiments of the present disclosure relate to a computer-implemented method for generating personalized security testing simulations for phishing and spear-phishing. The present disclosure relates further to a related system for generating personalized security testing simulations, and a computer program product for operating such a system.

Information security is a vital component for all large enterprises, but many firms struggle to adapt to the creative phishing attack methods that evolve with its ever-changing landscape. While some attack methods rely on technological solutions, phishing and spear-phishing attacks persist. Current system and method-based solutions often fail to protect users from the pervasive rise of hyper-targeted spear-phishing attacks.

However, systems and methods capable of addressing risks presented by phishing and spear-phishing attacks are needed. Embodiments of the present disclosure enable emulation of targeted spear-phishing attacks. In some embodiments, the present disclosure enables creation of personalized enterprise and individual attack simulations. Some embodiments of the present disclosure include a cognitive tool to hyper-personalize spear-phishing penetration tests based on correspondence analysis and user interaction feedback. Concepts of the present disclosure may enable implementation of enhanced and proactive cyber security efforts, training, and systems based on analysis of vulnerabilities and improper procedures revealed by responses to simulated spear-phishing attempts. Embodiments of the present disclosure address phishing, spear-fishing, and other attack vectors by increasing actionable awareness and protection by accurately emulating such hyper-targeted/personalized attacks. These embodiments encourage and document procedure and behavioral changes that provide increased resilience to these attacks. Further, embodiments, of the present disclosure provide information, trend analysis, and tools to strengthen information security standards at large enterprises. Some embodiments of the present disclosure detect and analyze user behavior and reactions to simulated attack communications to provide feedback and training responsive to specific behaviors, tendencies, or habits.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Figure 1:
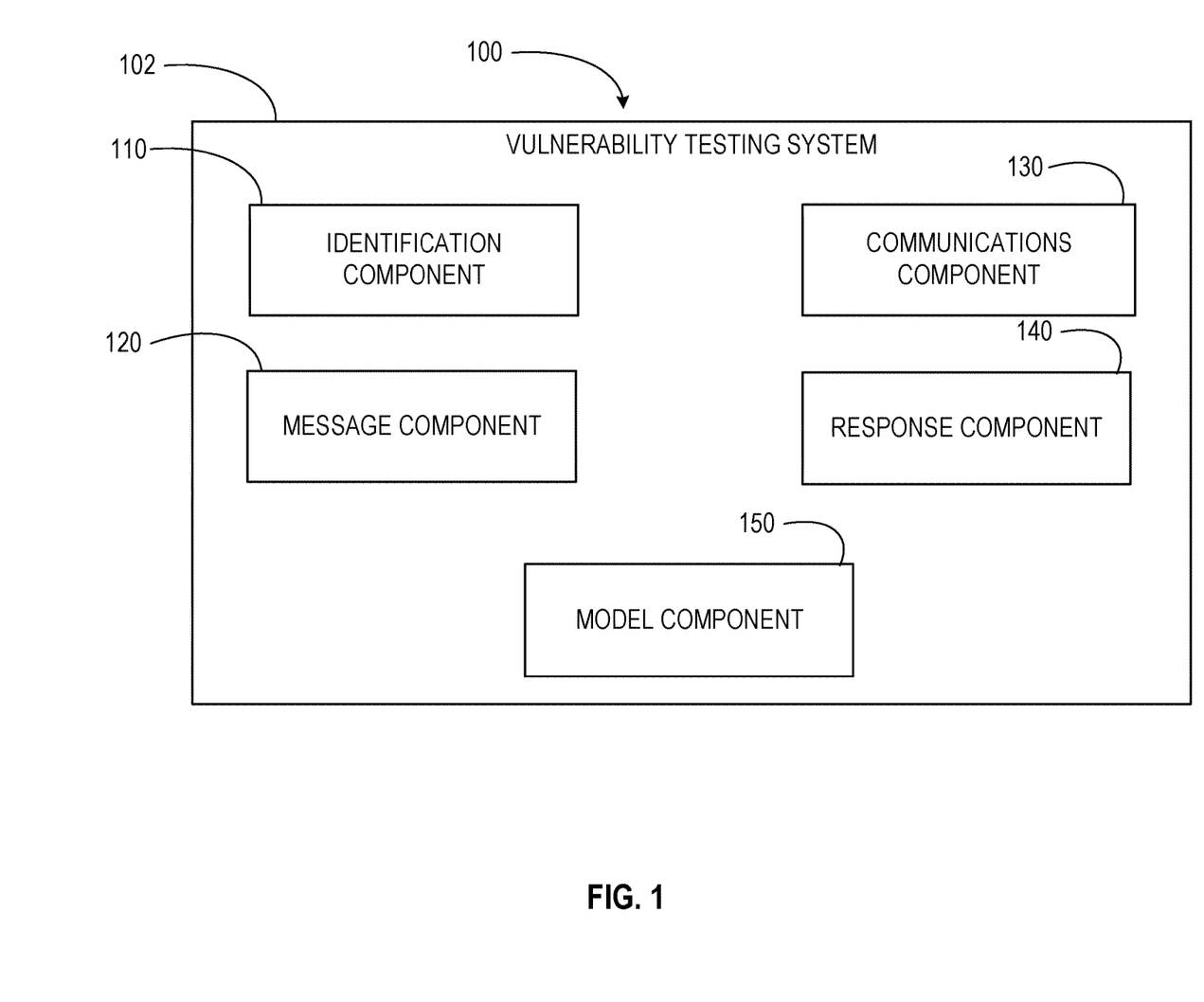
FIG. 1 depicts a block diagram of a computing environment for implementing concepts and computer-based methods, according to at least one embodiment.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may include a vulnerability testing system 102. The vulnerability testing system 102 may comprise an identification component 110, a message component 120, a communications component 130, a response component 140, and a model component 150. The identification component 110 identifies users and communication characteristics relating to users subject to vulnerability or security testing by the vulnerability testing system 102. The message component 120 generates simulated attack communications based on information and models available to the vulnerability testing system 102. The communications component 130 transmits simulated attack communications to users subject to vulnerability testing. The response component 140 identifies user responses to simulated attack communications. The model component 150 generates attack personalization models and modifies these models reflective of responses to simulated attack communications. Although described with distinct components, it should be understood that, in at least some embodiments, components may be combined or divided, or additional components may be added, without departing from the scope of the present disclosure.

Figure 2:
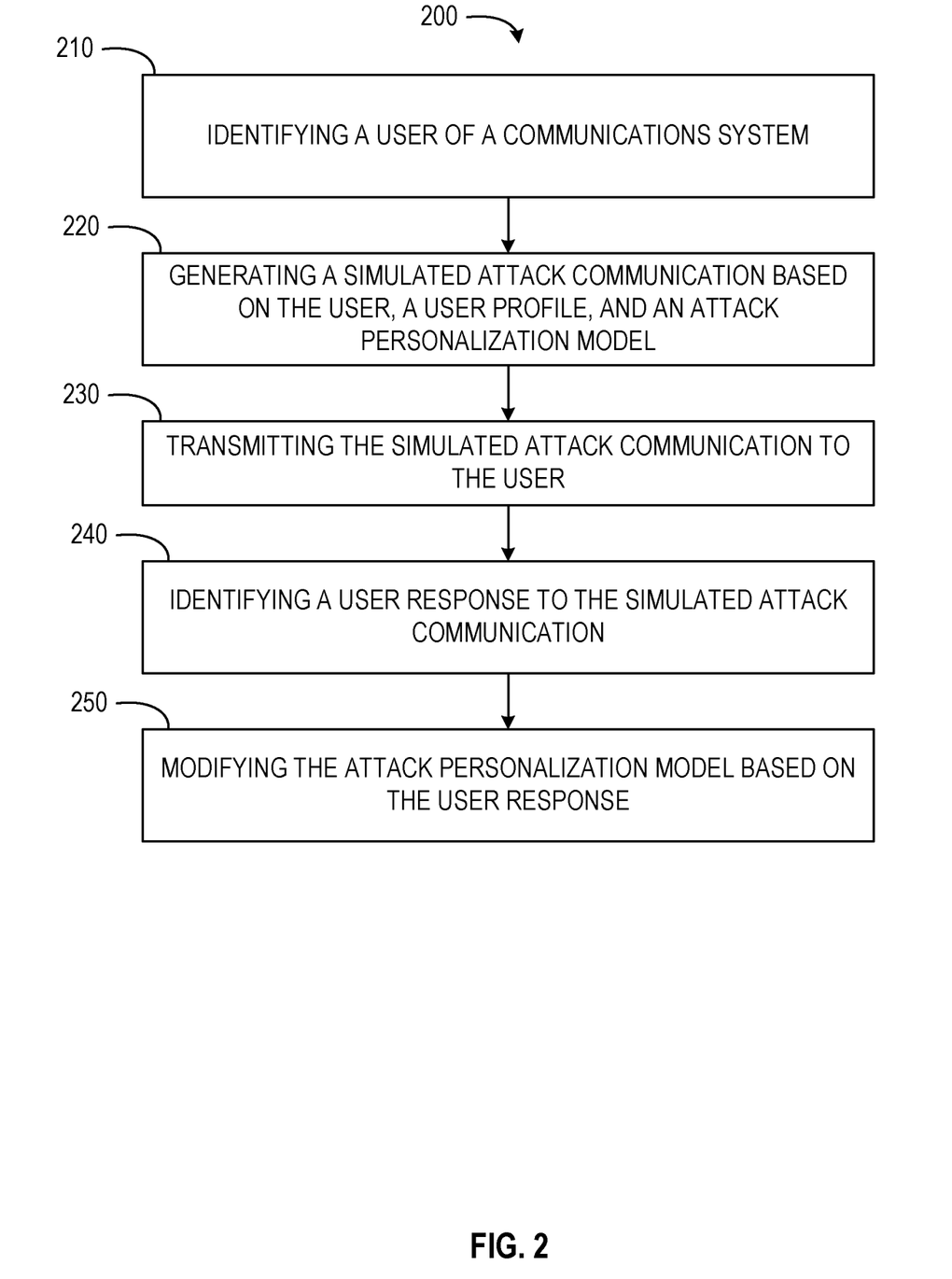
FIG. 2 depicts a flow diagram of a computer-implemented method for generating personalized security testing simulations, according to at least one embodiment.

Referring now to FIG. 2, a flow diagram of a computer-implemented method 200 is shown. The computer-implemented method 200 is a method for generating personalized security testing simulations. In some embodiments, the computer-implemented method 200 may be performed by one or more components of the computing environment 100, as described in more detail below.

At operation 210, the identification component 110 gathers information about user communications. In some embodiments, the identification component 110 identifies a user of a communications system as a subject of a simulated attack. The user may be associated with a user profile. The user profile may be comprised of metadata indicating user interactions with the communications system. In some embodiments, the identification component 110 identifies and collects communication engagement statistics of the user. The metadata indicating user interactions may include the communication engagement statistics for the user. In some instances, a user profile and the communication engagement statistics may indicate that a user has communications contacts, forming a known correspondents archive. The known correspondents may be at multiple entities, based in various locations, and may be internal or external to the communications system. The user profile and communication engagement statistics may also indicate a frequency of contact between the user and communications contacts and a frequency of contact of the user by new contacts. In some instances, the communication engagement statistics include a time delay between an incoming message and response of the user. The communication engagement statistics may also indicate a frequency with which the user opens attachments to communications, a comparative frequency for opening attachments between known and new contacts, and a time elapsed between opening a message and opening an attachment to the message. The user profile may also include user preferences or user settings established for the communications system.

In some embodiments, the communication engagement statistics may include a subset of data and meta-analysis of context, content, and communication style of messages to and from the user and one or more correspondents. The context, content, and communication style may be generated by aggregating the communications data between correspondents and using dimensionality reduction and natural language processing. Further, the identification component 110 may use topic modeling techniques to analyze the content and context of communications to determine current activities (e.g., projects with which the user is involved), common topics, common themes, common keywords or phrases, and prioritized topics associated with communications of the user. The message content may then be discarded, while the generated metadata for context, content, and communication style may be retained. The communication engagement statistics may be categorized by subject line, topic, and other relevant information.

The communication engagement statistics may be identified and collected during or after user interactions with the communications system. In some instances, the communication engagement statistics comprise metadata indicating preferences, communication times, communication durations, and communication types used by the user. In some embodiments, the identification component 110 identifies a set of correspondents for the user. The set of correspondents may be identified from the communication engagement statistics and represent individuals, groups, or entities with which the user communicates using the communications system. Collection and analysis of the communication engagement statistics may be done on an opt in or opt out basis, enabling the user to control a type, frequency, and other aspects of data collection and use.

In some embodiments, the identification component 110 identifies communication engagement statistics by identifying communication trends for one or more communication characteristics. The communication trends may represent usage or changes in usage of communications activity of the user on the communications system. The identification component 110 may identify topic trends for activity of the user on the communications system. In some embodiments, the identification component 110 identifies context trends for activity of the user on the communications system. In some embodiments, the communication trends may include a time of day, frequency of activity according to time of day, time to verification (e.g., a length of time the user takes to verify validity of a communication before interaction), attachment types trusted by or preferred by the user, a time of day the user is most susceptible to attack, combinations thereof, or any other suitable and identifiable trends related to characteristics and timing of communications. In some embodiments, communication trends include indications of trusted types for the user. Trusted types may be indicated by subjects, attachment types, correspondent characteristics, time characteristics, or other similar characteristics of communications most likely to be interacted with by the user, and with which the user takes less time to interact.

In some embodiments, the identification component 110 identifies one or more external profiles for the user. The external profiles may be social media profiles, website profiles, company profiles or other publicly available information for the user. The identification component 110 may incorporate at least a portion of the one or more external profiles of the user into the user profile for the communication system. The identification component 110 may also identify correspondents from the one or more external profiles of the user. In some embodiments, the identification component 110 notifies the user of identification and incorporation of the portions of the one or more external profile into the user profile of the communication system. The notification may be an opt out notification enabling the user to opt out of inclusion of the external profiles. The notification may also be an opt in, prompting the user to affirmatively profile permission to access and incorporate portions of the external profiles.

In some embodiments, once the set of correspondents are identified, the identification component 110 ranks correspondents of the set of correspondents. The identification component 110 may generate a ranked set of correspondents based on the communication engagement statistics, the one or more external profiles, and the attack personalization model, described in more detail below. The set of correspondents (e.g., known correspondents archive) may be ranked according to susceptibility of attack, frequency of communication, type of communication, length of communication, frequency of opening attachments, role (e.g., job type), relationship, combinations thereof, or any other indicator or characteristic linking the user and each correspondent. In some embodiments, ranking based on susceptibility is performed by generating a susceptibility score based on a content, a context, and a frequency of communication between the user and each correspondent. The susceptibility score may indicate a likelihood of the user opening a message from the correspondent, opening an attachment from the correspondent, and responding to the correspondent. The susceptibility score may also indicate a likelihood of the vulnerability testing system 102 matching a simulated message to a content and context of communication between the user and a given correspondent.

At operation 220, the message component 120 generates a simulated attack communication for use during the simulated attack. In some embodiments, the message component 120 generates the simulated attack communication based on one or more of the user, the user profile, and an attack personalization model. The attack personalization model may take the form of an Attack Generation and Personalization Module (AGP). In some embodiments, the message component 120 identifies and retrieves information regarding recent communications of the user. The message component 120 may identify context, content, and communication style associated with the user. The context, content, and communication style may be determined based on publicly available information for the user. In some embodiments, the context, content, and communication style may be retrieved from the communication engagement statistics. The message component 120 may also access user history and user profile information to identify and retrieve the context, content, and communication style. In some instances, the message component 120 identifies a correspondent associated with the user and accesses context, content, and communication style information for the correspondent. The information relative to the correspondent may be retrieved from communications engagement statistics indicating or representing communications between the user and the correspondent.

In some embodiments, the message component 120 uses the context, content, and communication style as input into the attack personalization model. The message component 120 may select a communication template (e.g., an email template) based on the above-referenced information about the user. The message component 120 may then insert, using natural language generation techniques, message content into the communication template. The message content may be generated to model, match, or be similar to the context, content, and communication style retrieved for the user. In some instances, the message component 120 uses natural language processing, context, content, and communication style to add non-communicative elements or colloquialisms to the simulated attack communication. For example, the message component 120 may analyze aspects of communications of the user and a specified correspondent to identify a colloquialisms or informalities used by the correspondent (e.g., using "ttyl" instead of the phrase "talk to you later"). Similarly, the message component 120 may add tag lines (e.g., "Sent from my iPhone") or non-communicative elements to the simulated attack message, where such lines or elements appear in context, content, or communication style of the user or a specified correspondent. In some embodiments, the message component 120 adds elements, colloquialisms, content, and other information to the simulated attack communication, where the message component or the attack personalization model indicates addition of such information will increase a likelihood of the user interacting with the simulated attack communication to produce a successful attack.

At operation 230, the communications component 130 transmits the simulated attack communication to the user. In some embodiments, the communications component 130 transmits the simulated attack communication using the communications system. Transmission of the simulated attack communication may initiate the mock attack on the user for penetration testing related to phishing and spear-phishing attacks. The communications component 130 may transmit the simulated attack communication via email, text or SMS message, or any other suitable message or communication type.

At operation 240, the response component 140 identifies a user response to the simulated attack communication. The response component 140 may identify the user response to determine whether the user took one or more steps to validate or authenticate one or more of the simulated attack communication and an attachment associated therewith. In some embodiments, the response component 140 logs the user response into a response repository. The user response may be logged in association with the user or user profile.

The response component 140 may monitor one or more input streams to identify and monitor the user response. The user response may indicate a successful attack or an unsuccessful attack based on interaction or lack thereof with at least a portion of the simulated attack communication. For example, where the user opens the simulated attack communication and opens an attachment within the simulated attack communication, without risk mitigating techniques (e.g., virus scans performed on the attachment), the response component 140 may identify a successful attack. Where the user deletes the unopened simulated attack communication or fails to open an attachment, the response component 140 may identify a failed attack.

In some embodiments, the response component 140 initiates monitoring when the user opens, reads, or otherwise accesses the simulated attack communication. The response component 140 may monitor the response using input from one or more of a front-facing camera, a web camera, a microphone, a keyboard, a mouse, a touchscreen, combinations thereof, or any other suitable and relevant user input device, system, or service. Where the response component 140 monitors the response using a front-facing camera, the response component 140 may identify an area of interest within a field of view of the camera. For example, the area of interest may be a face or eyes of the user. The response component 140 may use image tracking, object tracking, or eye-tracking techniques to analyze visible or visual behavior of the user. The response component 140 may use a microphone or other external audio devices or capabilities to monitor audible behavior of the user in response to the simulated attack communication. The audio behavior may indicate whether the user unquestioningly opened the simulated attack communication and any associated attachment, indicated hesitation prior to opening the communication or attachment, disregarded the communication or attachment, or took steps to confirm an authenticity of one or more of the communication and the attachment (e.g., calling the correspondent of the communication). In some embodiments, users may be presented user interface elements, notifications, or other notice and interactive elements enabling the user to opt in or opt out of response monitoring. In some instances, in order to engage in vulnerability testing, users may opt in to monitoring through at least a portion of input means (e.g., cameras, microphones, etc.). In some instances, the user may selectively opt in to periodic monitoring based on receipt of a simulated attack communication.

Where the response component 140 identifies user interactions with the simulated attack communication which represent a successful attack, the response component 140 determines potential gaps in one or more validation procedures taken by the user. In some embodiments, the response component 140 accesses a response protocol, based on a successful attack. The response protocol may represent an entity approved procedure or set of steps to be taken by users to authenticate or verify communications to mitigate or prevent phishing, spear-phishing, or other attacks. The response component 140 may compare a set of steps of the response protocol with the user response identified in operation 240 to determine a subset of steps the user failed to perform prior to interacting with one or more of the simulated attack communication and an attachment. For example, the response component 140 may determine the user failed to call or message the correspondent associated with the simulated attack communication to determine the authenticity of the simulated attack communication or the attachment prior to opening the attachment.

At operation 250, the model component 150 modifies the attack personalization model based on the user response. Where the attack succeeded, the user response and the content and characteristics of the simulated attack communication may be passed to the model component 150 as a successful attack or positive feedback for the simulated attack communication. Where the attack failed, the user response and aspects of the simulated attack communication may be passed to the model component 150 as a failed attack or negative feedback for the simulated attack communication. The model component 150 may pass the feedback, positive or negative, to the attack personalization model as training input.

In some embodiments, the attack personalization model uses a neural network to train and predict effective attack communications and content. The model component 150 may use supervised learning method (e.g., a supervised learning loop using machine learning techniques). In some instances, the supervised learning methods include neural networking, convolutional neural networking, or other suitable machine learning methodology to train the attack personalization model. The supervised learning methods may be aggregated against dimensionality reduction to further refine messaging consideration input. Once trained, the model component 150 uses positive feedback for positive reinforcement of the attack personalization model to craft future simulated attack communications in a similar manner. The model component 150 uses negative feedback for negative reinforcement to modify input for future simulated attack communications. Subsequent simulated attack communications increase hit rates for successful attacks by reducing a frequency of use for characteristics of communications associated with failed feedback.

Figure 3:
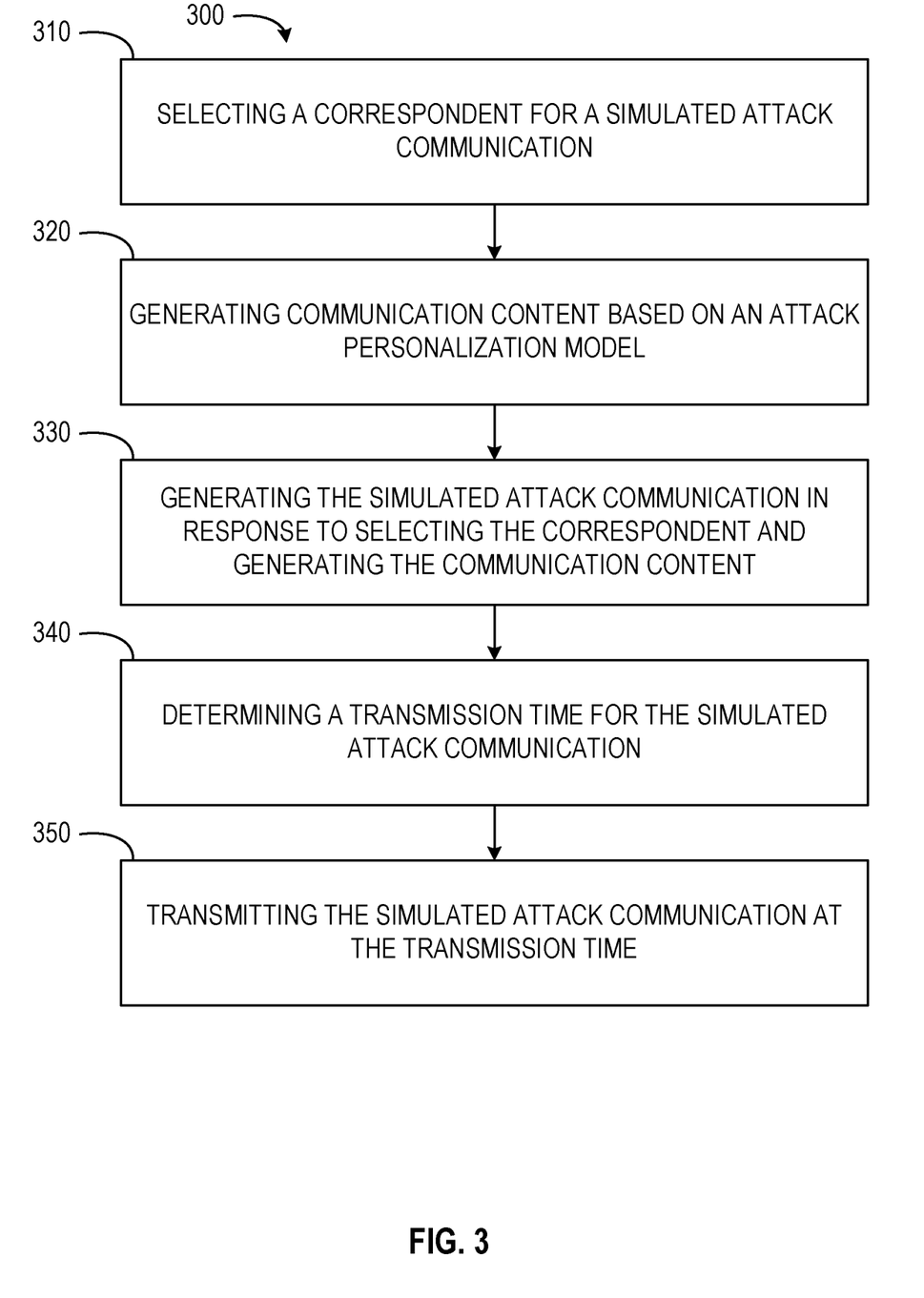
FIG. 3 depicts a flow diagram of a computer-implemented method for generating personalized security testing simulations, according to at least one embodiment.

FIG. 3 shows a flow diagram of an embodiment of a computer-implemented method 300 for generating personalized security testing simulations. The method 300 may be performed by or within the computing environment 100. In some embodiments, the method 300 comprises or incorporates one or more operations of the method 200. In some instances, operations of the method 300 may be incorporated as part of or sub-operations of the method 200 (e.g., operation 220).

In operation 310, the message component 120 generates or initiates generation of the simulated attack communication by selecting a correspondent. The correspondent may be selected from a ranked set of correspondents. The ranked set of correspondents may be included in the known correspondents archive. The known correspondents archive may identify and monitor correspondent communications with the user to identify frequency or recency of communications, trusted correspondents, average response times to communications, and average validation times for communications. In some embodiments, the correspondent is selected as a highest ranked correspondent of the set of correspondents. The correspondent may also be selected, or the ranks modified, using cohort analysis and comparison of relationships between other users. The correspondent may also be selected based on a susceptibility score. In these instances, the selected correspondent may have a highest susceptibility score for the user among the ranked set of correspondents.

In operation 320, the message component 120 generates communication content based on the attack personalization model. In some embodiments, the message component 120 generates communication content using the attack personalization model and information relating to one or more communications between the correspondent and the user. The information may be communication context, communication content, communication topics, communication or messaging types, combinations thereof, or any other suitable information available to and approved for use by the message component 120. In some instances, the message component 120 uses topic modeling to identify or derive context of recent communications between the user and the selected correspondent. Common topics, themes, project names, keywords, or phrases, which may be publicly accessible, may be used to generate the communication content. Similarly, a relationship between the user and the selected correspondent may be used to generate communication content.

In some embodiments, the message content 120 selects a simulated malicious attachment for the simulated attack communication. The simulated malicious attachment may be selected based on one or more media preferences of the user. In some embodiments, the simulated malicious attachment is selected based on the communication engagement statistics, including one or more media preferences of the user, to reflect an attachment or attachment type previously selected or accessed by a user when presented as an attachment of a message or communication.

In operation 330, the message component 120 generates a simulated attack communication in response to selecting a correspondent and generating the communication content. The message component 120 may generate the simulated attack communication as a communications message from the correspondent and containing the communication content. The simulated attack communication may be generated with the content discussed above in operation 320 and generated in a manner similar to or substantially the same as described above with respect to operation 220.

In operation 340, cooperates with the identification component 110 to determine a transmission time for the simulated attack communication. The transmission time may be based on the user profile, the correspondent, the communication engagement statistics of the user, the attack personalization model, combinations thereof, or any other suitable information. The transmission time may be selected or determined as a time for transmitting the simulated attack communication to coincide with similar, legitimate communications. For example, the message component 120 and the identification component 110 may cooperate to determine a time or range of time at which the user and the correspondent communicate. The transmission time may be determined as a time within the range of time for normal or anticipated communication with the correspondent.

In operation 350, the communications component 130 transmits the simulated attack communication at the transmission time. The communications component 130 may transmit the simulated attack in a manner similar to or the same as described above with respect to operation 230. In some embodiments, the communications component 130 cooperates with one or more of the message component 120, the response component 140, and the model component 150 to select and transmit a second simulated attack communication at a second transmission time. the second simulated attack communication may be generated as a follow-up attack based on users' responses or failures in user responses to the initial simulated attack communication.

Figure 4:
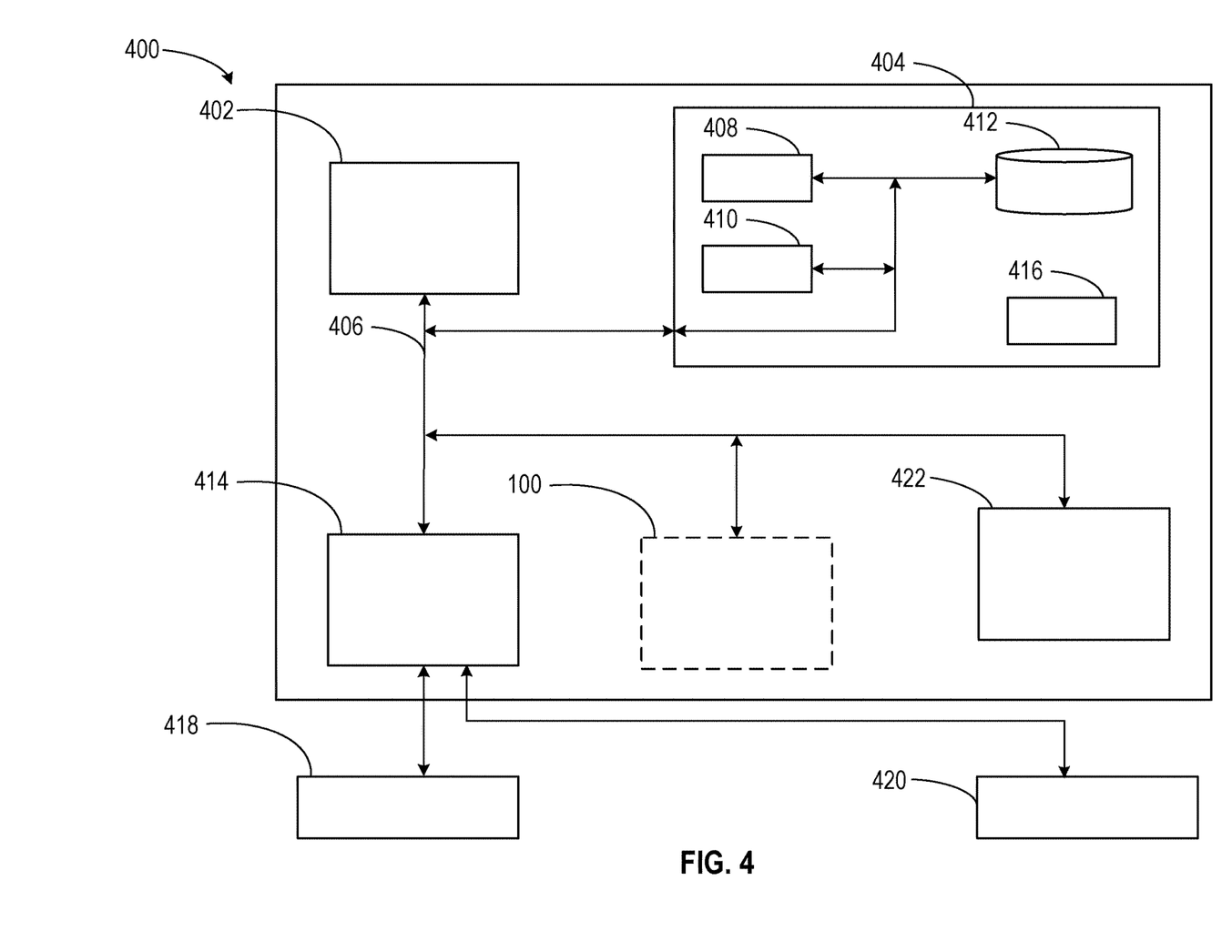
FIG. 4 depicts a block diagram of a computing system for generating personalized security testing simulations, according to at least one embodiment.

Embodiments of the present disclosure may be implemented together with virtually any type of computer, regardless of the platform being suitable for storing and/or executing program code. FIG. 4 shows, as an example, a computing system 400 (e.g., cloud computing system) suitable for executing program code related to the methods disclosed herein and for generating personalized security testing simulations.

The computing system 400 is only one example of a suitable computer system and is not intended to suggest any limitation as to the scope of use or functionality of embodiments of the present disclosure described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. Computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors 402 (e.g., processing units), a system memory 404 (e.g., a computer-readable storage medium coupled to the one or more processors), and a bus 406 that couple various system components including system memory 404 to the processor 402. Bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random-access memory (RAM) 408 and/or cache memory 410. Computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 406 by one or more data media interfaces. As will be further depicted and described below, the system memory 404 may include at least one program product having a set (e.g., at least one) of program modules that are configured to carry out the functions of embodiments of the present disclosure.

The program/utility, having a set (at least one) of program modules 416, may be stored in the system memory 404 by way of example, and not limiting, as well as an operating system, one or more application programs, other program modules, and program data. Program modules may include one or more of the identification component 110, the message component 120, the communications component 130, the response component 140, and the model component 150, which are illustrated in FIG. 1. Each of the operating systems, one or more application programs, other program modules, and program data or some combination thereof, may include an implementation of a networking environment. Program modules 416 generally carry out the functions and/or methodologies of embodiments of the present disclosure, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. Still yet, computer system/server 400 may communicate with one or more networks such as a local area network (LAN), a general wide area network (WAN), and/or a public network (e.g., the Internet) via network adapter 422. As depicted, network adapter 422 may communicate with the other components of computer system/server 400 via bus 406. It should be understood that, although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Service models may include software as a service (SaaS), platform as a service (PaaS), and infrastructure as a service (IaaS). In SaaS, the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. In PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. In IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models may include private cloud, community cloud, public cloud, and hybrid cloud. In private cloud, the cloud infrastructure is operated solely for an organization. It may be managed by the organization or a third party and may exist on-premises or off-premises. In community cloud, the cloud infrastructure is shared by several organizations and supports specific community that has shared concerns (e.g., mission, security requirements, policy, and compliance considerations). It may be managed by the organizations or a third party that may exist on-premises or off-premises. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling modularity, and semantic interoperability. At the heart of cloud computing is an infrastructure that includes a network of interconnected nodes.

Figure 5:
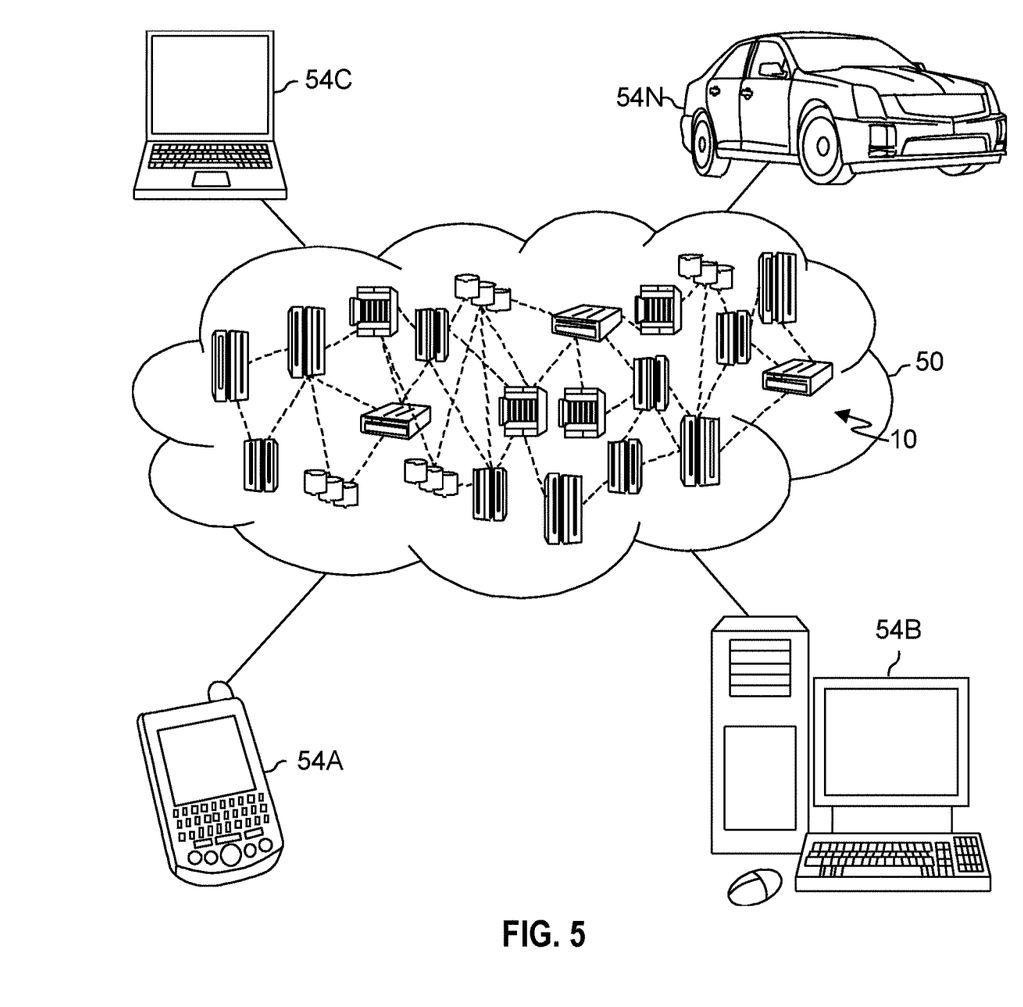
FIG. 5 is a schematic diagram of a cloud computing environment in which concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
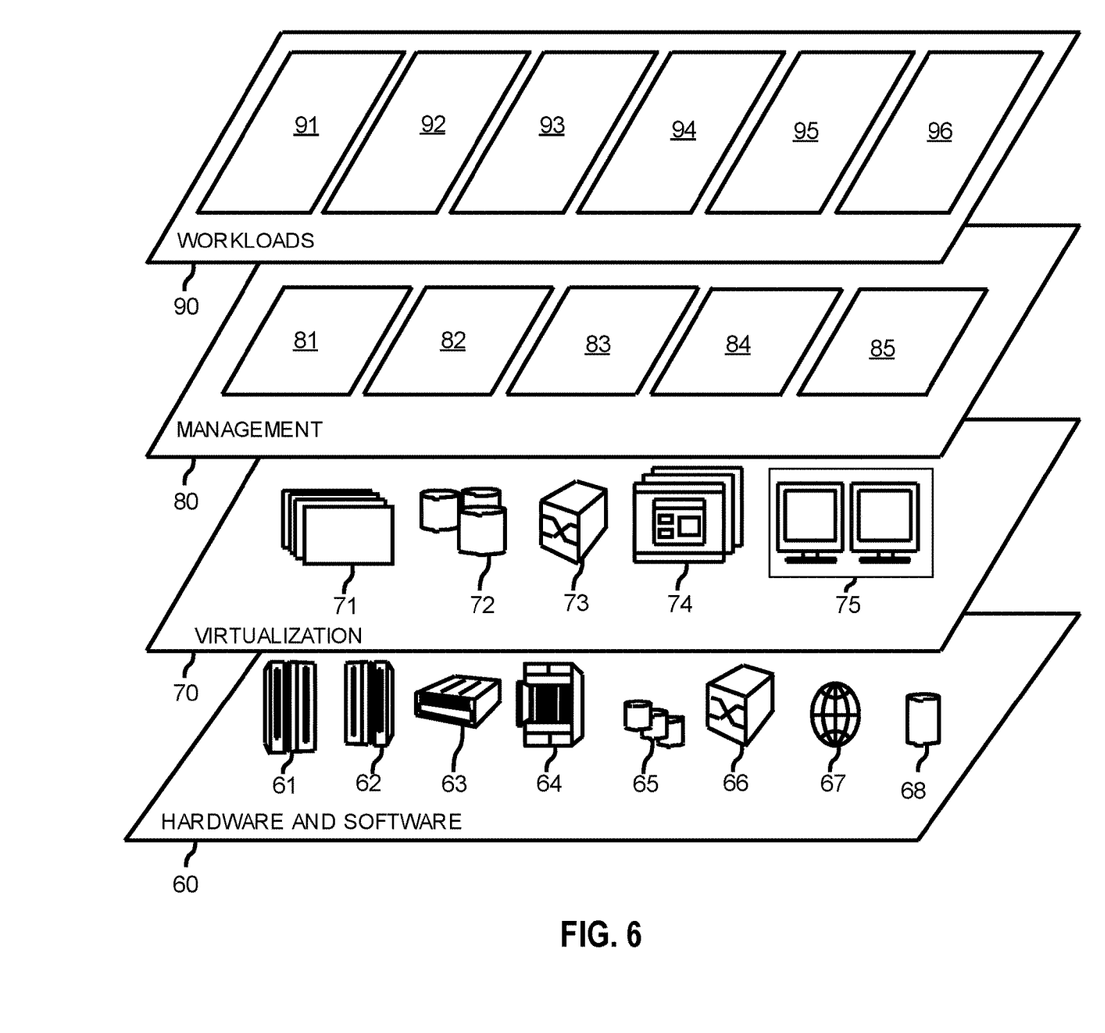
FIG. 6 is a diagram of model layers of a cloud computing environment in which concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 5 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

Cloud models may include characteristics including on-demand self-service, broad network access, resource pooling, rapid elasticity, and measured service. In on-demand self-service a cloud consumer may unilaterally provision computing capabilities such as server time and network storage, as needed automatically without requiring human interaction with the service's provider. In broad network access, capabilities are available over a network and accessed through standard mechanisms that promote use by heterogeneous thin or thick client platforms (e.g., mobile phones, laptops, and PDAs). In resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). In rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. In measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying a user of a communications system, the user being associated with a user profile and a set of correspondents;
   generating a simulated attack communication based on the user, the user profile, at least one correspondent of the set of correspondents, and an attack personalization model;
   transmitting the simulated attack communication to the user via the communications system;
   identifying a user response to the simulated attack communication; and
   modifying the attack personalization model based on the user response.

2. The computer-implemented method of claim 1, further comprising:
   identifying communication engagement statistics of the user;
   identifying one or more external profiles for the user; and
   identifying the set of correspondents for the user from the communication engagement statistics and the one or more external profiles.

3. The computer-implemented method of claim 2, wherein identifying communication engagement statistics further comprises:
   identifying communication trends for one or more communication characteristics for activity of the user on the communications system;
   identifying topic trends for activity of the user on the communications system; and
   identifying context trends for activity of the user on the communications system.

4. The computer-implemented method of claim 2, wherein identifying the set of correspondents for the user further comprises:
   ranking correspondents of the set of correspondents to generate a ranked set of correspondents based on the communication engagement statistics, the one or more external profiles, and the attack personalization model.

5. The computer-implemented method of claim 4, wherein generating the simulated attack communication further comprises:
   selecting a correspondent from the ranked set of correspondents; and
   generating communication content based on the attack personalization model and one or more communications between the correspondent and the user.

6. The computer-implemented method of claim 5, wherein transmitting the simulated attack communication further comprises:
   determining a transmission time for the simulated attack communication based on the user profile, the correspondent, and the attack personalization model; and
   transmitting the simulated attack communication at the transmission time.

7. The computer-implemented method of claim 2, wherein the communication engagement statistics includes one or more media preferences of the user, and wherein generating the simulated attack communication further comprises:
   selecting a simulated malicious attachment for the simulated attack communication based on the one or more media preferences of the user.

8. A system, comprising:
   one or more processors; and
   a computer-readable storage medium, coupled to the one or more processors, storing program instructions that, when executed by the one or more processors, cause the one or more processors to perform operations comprising:
   identifying a user of a communications system, the user being associated with a user profile and a set of correspondents;
   generating a simulated attack communication based on the user, the user profile, at least one correspondent of the set of correspondents, and an attack personalization model;
   transmitting the simulated attack communication to the user via the communications system;
   identifying a user response to the simulated attack communication; and
   modifying the attack personalization model based on the user response.

9. The system of claim 8, wherein the operations further comprise:
   identifying communication engagement statistics of the user;
   identifying one or more external profiles for the user; and
   identifying the set of correspondents for the user from the communication engagement statistics and the one or more external profiles.

10. The system of claim 9, wherein identifying communication engagement statistics further comprises:
    identifying communication trends for one or more communication characteristics for activity of the user on the communications system;
    identifying topic trends for activity of the user on the communications system; and
    identifying context trends for activity of the user on the communications system.

11. The system of claim 9, wherein identifying the set of correspondents for the user further comprises:
    ranking correspondents of the set of correspondents to generate a ranked set of correspondents based on the communication engagement statistics, the one or more external profiles, and the attack personalization model.

12. The system of claim 11, wherein generating the simulated attack communication further comprises:
    selecting a correspondent from the ranked set of correspondents; and
    generating communication content based on the attack personalization model and one or more communications between the correspondent and the user.

13. The system of claim 12, transmitting the simulated attack communication further comprises:
    determining a transmission time for the simulated attack communication based on the user profile, the correspondent, and the attack personalization model; and
    transmitting the simulated attack communication at the transmission time.

14. The system of claim 9, wherein the communication engagement statistics includes one or more media preferences of the user, and wherein generating the simulated attack communication further comprises:

selecting a simulated malicious attachment for the simulated attack communication based on the one or more media preferences of the user.

15. A computer program product comprising a computer readable storage medium having program instructions embodied therewith, the program instructions being executable by one or more processors to cause the one or more processors to perform operations comprising:

identifying a user of a communications system, the user being associated with a user profile and a set of correspondents;

generating a simulated attack communication based on the user, the user profile, at least one correspondent of the set of correspondents, and an attack personalization model;

transmitting the simulated attack communication to the user via the communications system;

identifying a user response to the simulated attack communication; and modifying the attack personalization model based on the user response.

16. The computer program product of claim 15, wherein the operations further comprise:

identifying communication engagement statistics of the user;

identifying one or more external profiles for the user; and identifying the set of correspondents for the user from the communication engagement statistics and the one or more external profiles.

17. The computer program product of claim 16, wherein identifying communication engagement statistics further comprises:

identifying communication trends for one or more communication characteristics for activity of the user on the communications system;

identifying topic trends for activity of the user on the communications system; and identifying context trends for activity of the user on the communications system.

18. The computer program product of claim 16, wherein the operations further comprise:

ranking correspondents of the set of correspondents to generate a ranked set of correspondents based on the communication engagement statistics, the one or more external profiles, and the attack personalization model;

selecting a correspondent from the ranked set of correspondents; and generating communication content based on the attack personalization model and one or more communications between the correspondent and the user.

19. The computer program product of claim 18, wherein transmitting the simulated attack communication further comprises:

determining a transmission time for the simulated attack communication based on the user profile, the correspondent, and the attack personalization model; and transmitting the simulated attack communication at the transmission time.

20. The computer program product of claim 16, wherein the communication engagement statistics includes one or more media preferences of the user, and wherein generating the simulated attack communication further comprises:

selecting a simulated malicious attachment for the simulated attack communication based on the one or more media preferences of the user.

\* \* \* \* \*